United States Patent [19]

Zinsmeyer

[11] Patent Number: 5,209,080
[45] Date of Patent: May 11, 1993

[54] REFRIGERANT FLOW CONTROL DEVICE
[75] Inventor: Thomas M. Zinsmeyer, Pennellville, N.Y.
[73] Assignee: Carrier Corporation, Syracuse, N.Y.
[21] Appl. No.: 822,784
[22] Filed: Jan. 21, 1992
[51] Int. Cl.[5] .................. F16K 31/18; F25B 41/04
[52] U.S. Cl. ............................ 62/216; 137/433; 62/190
[58] Field of Search .............. 62/190, 132, 216; 165/13; 137/430, 433, 432

[56] References Cited
U.S. PATENT DOCUMENTS

| | | | |
|---|---|---|---|
| 916,398 | 3/1909 | Edlund | 137/433 X |
| 972,738 | 10/1910 | Townsend | 137/433 X |
| 2,756,766 | 7/1956 | Tronic | 137/432 X |
| 3,399,544 | 9/1968 | Osborne | 62/218 |

Primary Examiner—William E. Wayner

[57] ABSTRACT

A cylindrical standpipe extends upwardly from the bottom of a liquid refrigerant sump, and vertical slots are formed in the sides thereof near the bottom end. On the inner sides of the standpipe, a sleeve is slideably disposed to uncover the slots as the sleeve is vertically raised. On the outer side of the standpipe a toroidal shaped float device, which is secured to the sleeve by a tube extending through upper side slots in the standpipe, is vertically moveable in response to the level of liquid refrigerant in the sump to thereby regulate the sleeve vertical position and therefore the flow of refrigerant from the sump.

7 Claims, 2 Drawing Sheets

REFRIGERANT FLOW CONTROL DEVICE

BACKGROUND OF THE INVENTION

This invention relates generally to refrigeration systems and, more particularly, to a device for controlling the flow of refrigerant from the condenser to the evaporator of a chiller system.

In centrifugal chiller refrigeration systems, it is necessary to regulate the flow of liquid refrigerant from the condenser to the evaporator, or cooler, of the system. In doing so, it is also necessary to prevent the flow of refrigerant gas from the condenser to the cooler. Heretofore, this has been accomplished in any of various ways. One approach is that shown in U.S. Pat. No. 5,009,079 issued on Apr. 23, 1991 and assigned to the Assignee of the present invention. This approach was simple and was responsive to the level of liquid refrigerant in the sump while, at the same time, preventing any bypass of refrigerant gas to the cooler, a feature which is particularly important when using high pressure refrigerant such as R-22.

A problem that the Applicant encountered with the above described patented apparatus was that the cylindrical sleeve that was slideably mounted on the outer side of the cylindrical standpipe member tended to hang up on the standpipe or cycle up and down continuously. This was found to occur because of undesirable axial and/or radial forces that tended to act on the sleeve. This was caused, in part, by the differential pressure between the condenser and the cooler. That is, the pressure within the condenser, and that on the outer side of the sleeve and standpipe, is typically about 210 psi, while the pressure in the evaporator, and also on the inner side of the standpipe, is about 80 psi. Thus, if the sleeve tends to move to a non-symmetrical position with respect to the standpipe, then this pressure differential was found to bias it to that position and to thereby cause a hanging up of the sleeve on the standpipe. As a result, the device is not responsive to the level of refrigerant in the sump, and inefficiencies occur.

It is therefore an object of the present invention to provide an improved refrigerant flow metering apparatus for a centrifugal chiller system.

Another object of the present invention is the provision for a refrigerant flow control device that is responsive to the level of liquid refrigerant in the condenser.

Yet another object of the present invention is the provision for a refrigerant flow control device which is not adversely effected by the pressure differential across the device.

Still another object of the present invention is the provision in a centrifugal chiller system, for a refrigerant flow control device which is simple and reliable in operation.

These objects and other features and advantages become more readily apparent upon reference to the following description when taken into conjunction with the appended drawings.

SUMMARY OF THE INVENTION

Briefly, in accordance with one aspect of the invention, the refrigerant flows from the outer side of a standpipe in the condenser sump, through vertical refrigerant flow slots in the lower portion of the standpipe. The flow is selectively controlled by a sleeve slideably mounted on the inside of the standpipe and connected to a float device on the outside of the standpipe so as to be vertically moveable and response to the liquid level of refrigerant in the sump. In this way, the vertical height of the internal sleeve selectively covers and uncovers the vertical slots to allow the liquid refrigerant to flow to the cooler as the level of liquid refrigerant rises in the sump.

By another aspect of the invention, the standpipe includes additional upper slots, located vertically above the refrigerant flow slots, and the float device is mechanically connected to the internal sleeve by way of connecting rods passing through the upper slots. The slots and connecting rods are preferably symmetrically located on opposite side of the standpipe so as to maintain a desired balance of forces.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figures 1, 2:
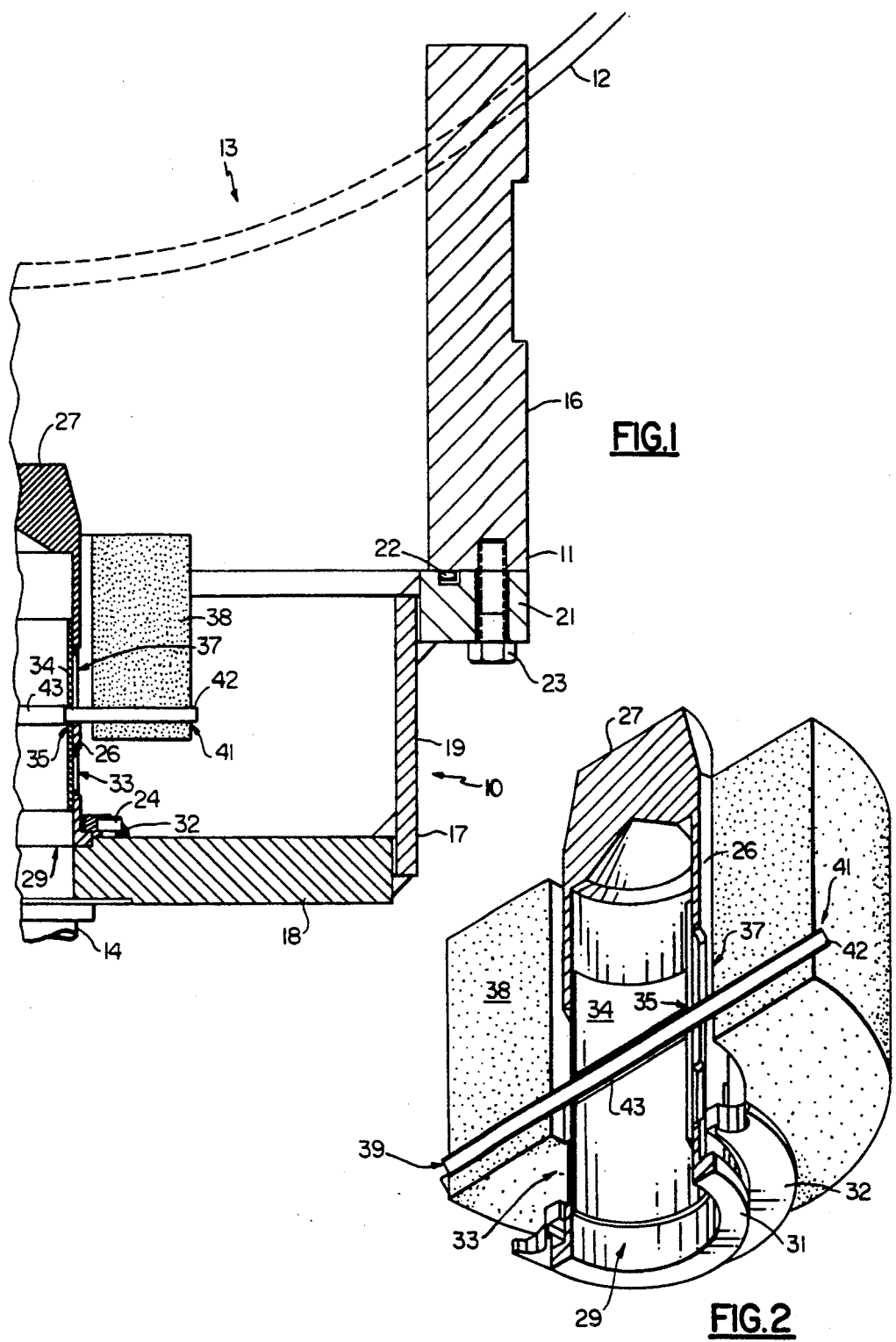
FIG. 1 is a partial view of a condenser with the flow control apparatus of the present invention incorporated therein.
FIG. 2 is a perspective view of the flow control apparatus of the present invention.

Referring now to FIG. 1, the invention is shown generally at 10 as installed in a sump 11 at the lower side of a condenser 12 in a centrifugal refrigeration system. The opening 13 in the lower portion of the condenser 12 allows for the flow of liquid refrigerant into the sump 11 below. As the level of liquid refrigerant rises in the sump 11, the flow control device of the present invention 10 meters the flow to a refrigerant return line 14 and then to the cooler (not shown).

The sump 11 includes both an upper sump portion 16 and a lower sump portion 17. The upper sump portion 16 is a cylindrical pipe that extends through the wall of the condenser 12 and is secured thereto by welding or the like. The upper sump portion 16 provides a space into which the upper portion of the refrigerant flow control device 10 is received, and also provides a means of securing the lower sump portion 17 to its lower end.

The lower sump portion 17 comprises a bottom plate 18, a cylindrical side wall 19 welded to the outer edge of the bottom plate 18 and extending upwardly to just below the upper sump portion 16, and a mounting flange 21 welded to and extending radially outwardly from the top of the cylindrical side wall 19 to engage the bottom surface of the upper sump portion 16. An 'O' ring 22 is provided to ensure that there is a sealed relationship between the two elements, and a plurality of bolts 23 function to securely fasten the two elements together. The lower sump portion 17 is so secured to the upper sump portion 16 after the refrigerant flow control device 10 has been secured to the bottom plate 18 by bolts 24.

Figure 3:
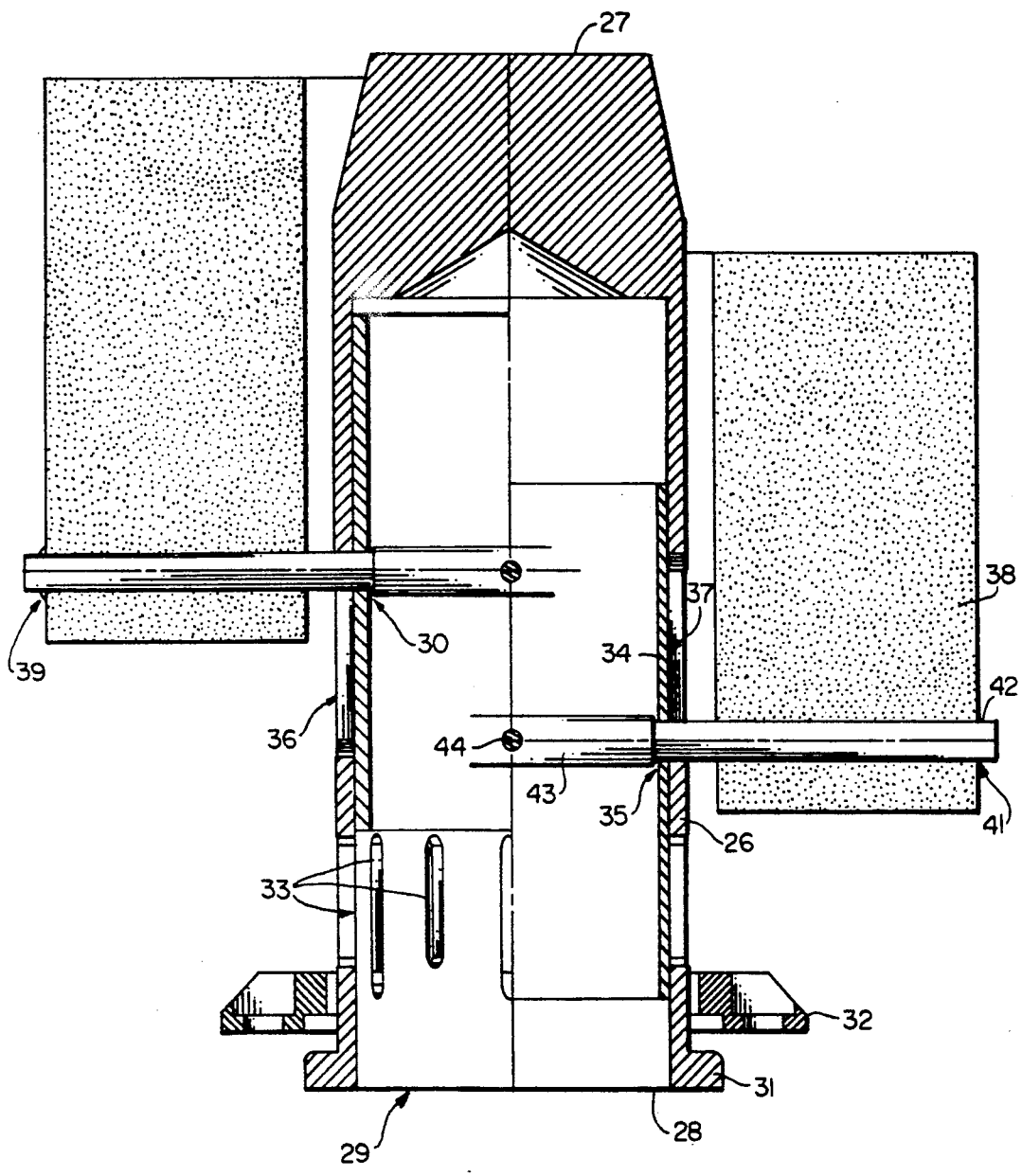
FIG. 3 is a sectional view thereof showing the sleeve and float device in both the upper-most and the lower-most positions, respectively.

Referring now to FIGS. 1, 2 and 3, the refrigerant flow control device of the present invention is shown to include a cylindrical standpipe 26 having a closed top 27 and a bottom end 28 having a full opening 29, with an outer flange 31 projecting radially outwardly for purposes of securing the standpipe 26 to the bottom plate 18 by way of a clamping ring 32, which is brought down into engagement with the outer flange 31 and secured to the bottom plate 18 by bolts 24.

Near the standpipe bottom end 28 there are a plurality of elongated, vertically oriented, refrigerant flow slots 33 for providing fluid communication between the outer side of the cylindrical wall and the inner side thereof. In order to control the flow of refrigerant passing through these slots, a cylindrical sleeve 34 is slideably mounted within the cylindrical structure of the standpipe 26. That is, the sleeve 34 is moved vertically within the cylindrical standpipe 26 so as to selectively cover or uncover the slots 33 so as to thereby control the amount of flow of refrigerant through the slots in a manner to be more fully described hereinafter. A pair of openings, 30 and 35 are provided on opposite sides of the sleeve 34 for attaching it to a device for moving it up and down as will be described hereinafter. The clearance between the sleeve 34 and the inner wall of the standpipe 26 should preferably be such that the sleeve easily moves vertically within the standpipe but will not allow liquid refrigerant to flow between the sleeve and the inner wall of the standpipe. For example, a diameteral clearance in the range of 0.010 to 0.014 inches is recommended.

Also formed in the wall of the cylindrical standpipe 26, at a location vertically above the elongated refrigerant flow slots 33, are a pair of upper slots 36 and 37, symmetrically located on opposite side of the standpipe 26. The purpose of the upper slots 36 and 37 is to provide for a mechanical linkage between the cylindrical sleeve 34 and a toroidal shaped float device 38 surrounding the outer side of the cylindrical standpipe 26.

The float device 38 is made of a floatation material that is resistant to chemical reaction with the refrigerant. A material that has been found to be suitable for this purpose is a synthetic foam composed of a slurry of micro balls adhesively held together by epoxy, with a density of 21-25 pounds/cubic feet. The cylindrical sleeve 34 is preferably made of the same material as the standpipe 26. A material that has been found to be suitable is a half hard, XB40-8 (copper alloy C36000).

Formed in the float device 38, at opposite sides thereof, are the openings 39 and 41 for receiving a tube 42 therein. The tube 42 thus passes through the opening 39 in the one side of the float device 38, through the upper slot 36, into the opening 30 at the one side of the cylindrical sleeve 34, extending across the sleeve 34 and out the opening 35 on the other side thereof, through the upper slot 37, and finally through the opening 41 at the other side of the float device 38. The tube 42 is secured within the openings 39 and 41 of the float device 38 by an epoxy adhesive or the like. In order to maintain a symmetrical relationship between the float device 38 and the cylindrical standpipe 26, a larger tube 43 is installed over the tube 42, in that area within the cylindrical sleeve 34, and the two are secured together by way of a cotter pin 44 of the like. The length of tube 43 is such that the ends are very close to the inner walls of the sleeve 34 so as to thereby prevent any substantial side to side movement of the tube 43 within the sleeve 34.

Referring now to FIG. 3, the positions of the float device are shown both for the closed and open positions of the valve. In the right hand side of the figure, the float device 38 is shown in its lower-most position, which is representative of that position in which it would be during periods of low liquid refrigerant level in the sump 11. As will be seen, the tube 42 is at a lowermost position within the upper slot 37, and the sleeve 34 is in a lower position so as to completely cover the lower slots 33 and thereby prevent any flow of refrigerant into the internal area of the sleeve 34. As the liquid refrigerant level tends to rise, the float device 38 will rise accordingly and the sleeve 34 will be raised to a point where the elongate slots 33 are opened to allow the refrigerant to flow, with the degree of opening being related to the vertical height of the float device 38. At its maximum height, the tube 42 will be at the upper-most position within the upper slots 36 and 37, and the sleeve 34 will be in the upper position shown on the left so as to completely expose the slots 33 to the maximum flow of refrigerant.

With the sleeve 34 thus being located on the inner side of the standpipe 26, the differential pressure across the standpipe 26 tends to maintain a concentric relationship between the two elements so as to thereby prevent the hanging up of the sleeve 34 on one side of the standpipe 26. In this way, the free vertical movement of the sleeve 34 is assured to thereby provide for accurate control of refrigerant flow.

While the present invention has been disclosed with particular reference to a preferred embodiment, the concepts of this invention are readily adaptable to other embodiments, and those skilled in the art may vary the structure thereof without departing from the essential spirit of the present invention.

What is claimed is:

1. A refrigerant flow control device for regulating the flow of refrigerant from a condenser sump in response to the level of liquid refrigerant in the sum comprising:
    a standpipe extending upwardly from a lower portion of and contained completely within the sum and having near its lower end at least one opening formed to provide fluid communication from the lower portion of the drain pipe on the outer side of said standpipe, into said standpipe, and to a refrigerant return line;
    a sleeve slideably disposed within said standpipe and moveable between a lower position in which it covers said standpipe opening and an upper position in which is uncovers said standpipe opening to allow the liquid refrigerant to flow through said opening to said refrigerant return line; and
    a float device slideably disclosed in surrounding relationship on the outer side of said standpipe so as to be moved vertically in response to the level of liquid refrigerant in the sump, said float device being connected to said sleeve such that said sleeve moves vertically with said float device and thereby covers said standpipe opening when the liquid refrigerant is at a lower level in said sump and uncovers said opening when the liquid refrigerant is at a higher level in said sump.

2. A refrigerant flow control device as set forth in claim 1 wherein said standpipe opening is a vertical slot.

3. A refrigerant flow control device as set forth in claim 1 wherein said standpipe is of a cylindrical shape.

4. A refrigerant flow control device as set forth in claim 1 wherein said at least one opening comprises a plurality of openings symmetrically located on the sides of said standpipe.

5. A refrigerant flow control device as set forth in claim 1 wherein said float device is generally toroidal shaped with a cylindrical cavity at its center.

6. A refrigerant flow control device for regulating the flow of refrigerant from a condenser sump in response to the level of liquid refrigerant in the sump comprising:

a standpipe extending upwardly from a lower portion of and contained completely within the sump and having near its lower end at least one opening formed to provide fluid communication from the lower portion of the drain pipe on the outer side of said standpipe, into said standpipe, and to a refrigerant return line;

a sleeve slideably disposed in surrounding relationship with said standpipe and moveable between a lower position in which it covers said standpipe opening and an upper position in which is uncovers said standpipe opening to allow the liquid refrigerant to flow through said opening to said refrigerant return line; and a float device slideably disclosed on the outer side of said standpipe so as to be moved vertically in response to the level of liquid refrigerant in the sump, said float device being connected to said sleeve such that said sleeve moves vertically with said float device and thereby covers said standpipe opening when the liquid refrigerant is at a lower level in said sump and uncovers said opening when the liquid refrigerant is at a higher level in said sump;

wherein said float device is connected to said sleeve by a fastener extending through said slot and further wherein said at least one vertical slot comprises a pair of slots located on opposite sides of said standpipe, and said fastener comprises a tube passing through openings in the side of the sleeve and through the two slots to opposite sides of the float device.

7. A refrigerant flow control device as set forth in claim 6 and including a larger tube, surrounding said tube and secured thereto at a position within said sleeve to thereby restrict the axial movement of said tube.

* * * * *